United States Patent
Eichenauer et al.

(10) Patent No.: US 6,297,307 B1
(45) Date of Patent: Oct. 2, 2001

(54) ABS MOULDING COMPOSITIONS HAVING IMPROVED ODOR CHARACTERISTICS

(75) Inventors: Herbert Eichenauer, Dormagen; Harry Staratschek, Köln, both of (DE)

(73) Assignee: Bayer Aktiengesellschaft (DE)

(*) Notice: Subject to any disclaimer, the term of this patent is extended or adjusted under 35 U.S.C. 154(b) by 0 days.

(21) Appl. No.: 08/987,567

(22) Filed: Dec. 11, 1997

(30) Foreign Application Priority Data

Dec. 19, 1996 (DE) ................................................ 196 52 958

(51) Int. Cl.⁷ ........................................................ C08K 3/18
(52) U.S. Cl. ............................ 524/432; 524/433; 524/114
(58) Field of Search .................................. 524/432, 114, 524/433

(56) References Cited

U.S. PATENT DOCUMENTS

| | | | |
|---|---|---|---|
| 5,712,336 | * | 1/1998 | Gareiss et al. ..................... 524/373 |
| 5,728,800 | * | 3/1998 | Gottschalk et al. ................ 528/310 |
| 5,977,234 | * | 11/1999 | Pottier-Metz et al. ............. 524/430 |

OTHER PUBLICATIONS

W. Scholtan, H. Lange, Kolloid–Z. u. Z Polymere 250 (1972) 782–796).

* cited by examiner

*Primary Examiner*—Peter D. Mulcahy
(74) *Attorney, Agent, or Firm*—Connolly Bove Lodge & Hutz LLP

(57) ABSTRACT

Thermoplastic moulding compositions prepared from an ABS polymer and 0.05 to 5 wt. % (relative to ABS polymer) of a combination of zinc oxide and/or magnesium oxide and at least one compound containing epoxy groups.

18 Claims, No Drawings

ABS MOULDING COMPOSITIONS HAVING IMPROVED ODOR CHARACTERISTICS

This invention relates to moulding compositions based on ABS polymers having distinctly improved odour characteristics after thermoplastic processing.

ABS moulding compositions are two-phase plastics prepared from:

1. a thermoplastic copolymer of resin-forming monomers, for example styrene and acrylonitrile, wherein the styrene may be entirely or partially replaced by α-methylstyrene or methyl methacrylate; this copolymer, also known as a SAN resin or matrix resin, constitutes the outer phase;
2. at least one graft polymer which has been produced by polymerising one or more resin-forming monomers, for example those stated in 1.), in the presence of a rubber, for example butadiene homo- or copolymer ("grafting backbone"). This graft polymer ("elastomer phase" or "graft rubber") constitutes the disperse phase in the matrix resin.

Polymers 1.) and 2.) may be produced using known processes, such as emulsion, solution, bulk, suspension, precipitation polymerisation or by a combination of such processes.

Undesirable odours frequently develop when these ABS polymers are processed, in particular at high processing temperatures. These intrinsic odours may give rise to problems in certain applications for the mouldings (for example in car interiors).

The object of this invention is to provide ABS polymer moulding compositions which have no unpleasant odours once they have been processed into mouldings. In so doing, the other characteristics of the polymers should not be changed or only minimally so.

It has now been found that this may be achieved by adding small quantities of a combination of zinc oxide and/or magnesium oxide and at least one compound containing epoxy groups.

The present invention accordingly provides thermoplastic moulding compositions prepared from an ABS polymer and 0.05 to 5 wt. %, preferably 0.1 to 3 wt. % (in each case relative to ABS polymer), a combination of zinc oxide and/or magnesium oxide and at least one compound containing epoxy groups.

Specifically, the thermoplastic moulding compositions according to the invention preferably consist of I 100 Parts by Weight of an ABS Polymer Consisting of 1.) 5 to 100 wt. % of at least one graft copolymer produced by graft polymerising
1.1) 5 to 90 wt. % of a mixture of
1.1.1) 5 to 50 wt. % of acrylonitrile, methacrylonitrile, maleic anhydride, N-substituted maleimide or mixtures thereof and
1.1.2) 95 to 50 wt. % of styrene, α-methylstyrene, ring-substituted styrene, methyl methacrylate or mixtures thereof onto
1.2) 95 to 10 wt. % of at least one rubber having a glass transition temperature $T_G$ of <10° C. and
2.) 0 to 95 wt. % of at least one thermoplastic resin produced by polymerising
2.1) 5 to 50 wt. % of acrylonitrile, methacrylonitrile, maleic anhydride, N-substituted maleimide or mixtures thereof and
2.2) 95 to 50 wt. % of styrene, α-methylstyrene, ring-substituted styrene, methyl methacrylate or mixtures thereof and II. 0.05 to 5 parts by weight of a combination of zinc oxide and/or magnesium oxide and at least one compound containing epoxy groups.

For the purposes of the invention, ABS polymers contain 5 to 100 wt. %, preferably 7.5 to 80 wt. % and particularly preferably 10 to 70 wt. % of at least one graft polymer and 95 to 0 wt. %, preferably 92.5 to 20 wt. % and particularly preferably 90 to 30 wt. % of at least one thermoplastic resin.

For the purposes of the invention, graft rubbers are those in which monomers or monomer mixtures selected from among acrylonitrile, methacrylonitrile, maleic anhydride, N-substituted maleimide, styrene, α-methylstyrene, ring-substituted styrene, methyl methacrylate are graft polymerised onto a rubber.

Virtually any rubbers having glass transition temperatures of $\leq 10°$ C. are suitable, preferably those containing polymerised butadiene. Examples are polybutadiene, styrene/butadiene polymers, acrylonitrile/butadiene polymers, acrylate rubbers, optionally having incorporated structural units derived from butadiene, acrylate rubbers which contain a crosslinked rubber such as polybutadiene or a copolymer of butadiene with an ethylenically unsaturated monomer such as styrene and/or acrylonitrile as the core.

Polybutadiene is Preferred.

The graft polymers contain from 10 to 95 wt. %, in particular from 20 to 70 wt. %, of rubber and from 90 to 5 wt. %, in particular from 80 to 30 wt. %, of graft copolymerised monomers. The rubbers are present in the graft copolymers in the form of at least partially crosslinked particles having an average particle diameter ($d_{50}$) of 0.05 to 20.0 μm, preferably of 0.1 to 2.0 μm and particularly preferably of 0.1 to 0.8 μm, wherein the average particle diameter $d_{50}$ may be determined by ultracentrifuge measurements (c.f. W. Scholtan, H. Lange: *Kolloid.-Z. u. Z. Polymere* 250, (1972) 782–796).

Suitable graft copolymers may be produced by free-radical graft copolymerisation of styrene, α-methylstyrene, ring-substituted styrene, for example p-methylstyrene, (meth)acrylonitrile, methyl methacrylate, maleic anhydride, N-substituted maleimide, preferably N-phenylmaleimide or mixtures thereof in the presence of the rubber to be grafted. Preferred production processes are emulsion, solution, bulk or suspension polymerisation; the emulsion polymerisation process is particularly preferred for the production of the moulding compositions according to the invention.

The thermoplastic polymers may be obtained from the monomers graft copolymerised onto the rubber (graft monomers) or similar monomers, in particular from styrene, α-methylstyrene, p-methylstyrene, halostyrene, acrylonitrile, methacrylonitrile, methyl methacrylate, maleic anhydride, N-substituted maleimides, in particular N-phenyl-maleimide, or mixtures thereof.

Preferred copolymers are those prepared from 95 to 50 wt. % of styrene, α-methylstyrene, methyl methacrylate or mixtures thereof with 5 to 50 wt. % of acrylonitrile, methacrylonitrile, methyl methacrylate, maleic anhydride or mixtures thereof.

Particularly preferred thermoplastic copolymers contain from 20 to 40 wt. % of acrylonitrile and 80 to 60 wt. % of styrene or α-methylstyrene incorporated by polymerisation. These copolymers are known. They preferably have molecular weights of 15000–200000.

Compounds having at least one epoxy group which are usable according to the invention in combination with zinc oxide and/or magnesium oxide are in particular those substances having an epoxy oxygen content of 2 to 20 wt. %, preferably of 2.5 to 15 wt. % and particularly preferably of 3 to 10 wt. %.

Liquid compounds are preferred. These preferably have a molecular weight of below 2000, particularly preferably of below 1500. Examples of compounds according to the invention are epoxidised oils, such as for example epoxidised soya oils or epoxidised linseed oils or also alkyl epoxystearate compounds.

Such Compounds are Known.

In the combinations of zinc oxide and/or magnesium oxide and compound containing epoxy groups usable according to the invention, the components may be varied over wide ranges.

The weight ratio of oxide or oxide mixture to epoxy compound may be from 95:5 to 5:95, preferably from 80:20 to 20:80 and particularly preferably from 60:40 to 30:70.

In addition to the compounds according to the invention, conventional additives such as pigments, fillers, stabilisers, anti-static agents, lubricants, mould release agents, flame retardants and the like may also be added to the moulding compositions.

The present invention also provides a process for the production of the ABS polymer moulding compositions according to the invention.

In order to produce these compositions, 0.05 to 5 wt. %, preferably 0.1 to 3 wt. % (in each case relative to the moulding composition) of the combination of zinc oxide and/or magnesium oxide and compound containing epoxy groups is added to the ABS polymer described above and incorporated at elevated temperatures, for example 100° C. to 300° C. in conventional mixing units, kneaders, internal mixers, roll mills, screw compounders or extruders.

Depending upon the intensity of mixing, the residence time in the mixing process may range between 10 seconds and 30 minutes.

EXAMPLES

All Parts are Parts by Weight.
1. Components used
   A) Graft rubber prepared from 50 wt. % of polybutadiene having an average particle diameter ($d_{50}$) of 0.4 μm, onto which 36 wt. % of styrene and 14 wt. % of acrylonitrile have been grafted by emulsion polymerisation.
   B) Graft rubber prepared from 50 wt. % of polybutadiene having an average particle diameter ($d_{50}$) of 0.1 μm, onto which 36 wt. % of styrene and 14 wt. % of acrylonitrile have been grafted by emulsion polymerisation.
   C) Styrene/acrylonitrile (SAN)=72:28 copolymer having an $\overline{M}_w$ of approx. 15000 with $U=\overline{M}_w/\overline{M}_n-1$ of $\leq 2$ (molecular polydispersity), produced by solution polymerisation.
   C1) Styrene/acrylonitrile (SAN)=72:28 copolymer having an $\overline{M}_w$ of approx. 85000 with $U=\overline{M}_w/\overline{M}_n-1$ of $\leq 2$ (molecular polydispersity), produced by solution polymerisation.
   D) α-Methylstyrene/acrylonitrile (AMSAN)=72:28 copolymer having an $\overline{M}_w$ of approx. 65000 with $U=\overline{M}_{w/Mn}-1$ of approx. 2 (molecular polydispersity), produced by emulsion polymerisation.
   E) Zinc oxide (Merck KGaA)
   F) Magnesium oxide (Merck KGaA)
   G) Epoxidised soya oil (Edenol D 81 from Henkel KGaA)
   H) Epoxidised linseed oil (Edenol B 316 from Henkel KGaA)
   I) Alkyl epoxystearate (Edenol B 35 from Henkel KGaA).
2. Production and testing of moulding compositions The parts by weight stated in Table 1 of the individual polymer components were mixed together with 0.1 parts by weight of a silicone oil and 2 parts by weight of ethylenediamine bisstearylamide and the additives stated in Table 1 in an internal kneader at 200° C. to 230° C. within 3 to 5 minutes and the resultant mixture was pelletised and then converted into mouldings by injection moulding at 240° C.

Impact strength (unit: kJ/m²) was determined at room temperature ($a_k^{RT}$) and at −40° C. ($a_k^{-40°}$ C.) to ISO 180 A, ball indentation hardness $H_c$, (unit: N/mm²) was determined to DIN 53 456, the Vicat B heat deflection temperature (unit: ° C.) was determined to DIN 53 460. Processability was determined by measuring the melt volume index MVI to DIN 53 753U (unit: cm³/10 min).

Odour characteristics were rated in accordance with the Verband der Automobilindustrie e. V. (VDA,) recommendation relating to the determination of the odour characteristics of materials in motor vehicle interiors dated October 1992 (odour test. VDA 270 C3) (cf. Dokumentation Kraftfahrwesen e. V. (DKF), Ulrichstraeβ14, Bietigheim-Bissingen).

Rating scale for assessing odour to VDA 270

Mark 1: not perceptible

Mark 2: perceptible, not unpleasant

Mark 3: distinctly perceptible, but still not unpleasant

Mark 4: unpleasant

Mark 5: strongly unpleasant

Mark 6: intolerable

TABLE 1

Compositions of the moulding compositions tested

| Example | A (pbw) | B (pbw) | C (pbw) | C1 (pbw) | D (pbw) | E (pbw) | F (pbw) | G (pbw) | H (pbw) | I (pbw) |
|---|---|---|---|---|---|---|---|---|---|---|
| 1 | 40 | — | 60 | — | — | 0.5 | — | 0.5 | — | — |
| 2 (Comparison) | 40 | — | 60 | — | — | — | — | — | — | — |
| 3 (Comparison) | 40 | — | 60 | — | — | 0.5 | — | — | — | — |
| 4 (Comparison) | 40 | — | 60 | — | — | — | — | 0.5 | — | — |
| 5 | 40 | — | 60 | — | — | — | 0.5 | 0.5 | — | — |
| 6 | 40 | — | 60 | — | — | 0.5 | — | — | 0.5 | — |
| 7 | 40 | — | 60 | — | — | 0.5 | — | — | — | 0.7 |
| 8 | 15 | 15 | — | 70 | — | 0.5 | — | 0.5 | — | — |

TABLE 1-continued

Compositions of the moulding compositions tested

| Example | A (pbw) | B (pbw) | C (pbw) | C1 (pbw) | D (pbw) | E (pbw) | F (pbw) | G (pbw) | H (pbw) | I (pbw) |
|---|---|---|---|---|---|---|---|---|---|---|
| 9 | 15 | 15 | — | 70 | — | — | 0.6 | — | 0.8 | — |
| 10 | 12.5 | 12.5 | — | — | 75 | 0.5 | — | 0.5 | — | — |
| 11 (Comparison) | 12.5 | 12.5 | — | — | 75 | — | — | — | — | — |

TABLE 2

Test data for the moulding compositions investigated

| Example | $a_k^{RT}$ (kJ/m$^2$) | $a_k^{-40° C.}$ (kJ/m$^2$) | $H_c$ (N/mm$^2$) | Vicat B (° C.) | MVI (cm$^3$/10 min) | Odour rating (to VDA 270 C3) |
|---|---|---|---|---|---|---|
| 1 | 25.8 | 10.6 | 86 | 97 | 9.2 | 1.5 |
| 2 (Comparison) | 26.8 | 10.9 | 88 | 98 | 9.4 | 3.5 |
| 3 (Comparison) | 26.9 | 10.6 | 86 | 99 | 9.6 | 3 |
| 4 (Comparison) | 26.9 | 10.7 | 85 | 96 | 9.7 | 3 |
| 5 | 26.8 | 10.6 | 86 | 98 | 9.4 | 2 |
| 6 | 26.4 | 10.7 | 87 | 97 | 9.3 | 1.5 |
| 7 | 25.9 | 10.5 | 87 | 96 | 9.5 | 2 |
| 8 | 16.0 | 6.1 | 109 | 99 | 34.8 | 1.5 |
| 9 | 15.7 | 6.0 | 110 | 99 | 35.5 | 1.5 |
| 10 | 14.4 | 5.8 | 103 | 113 | 5.6 | 2.5 |
| 11 (Comparison) | 14.6 | 5.8 | 104 | 114 | 5.0 | 4 |

What is claimed is:

1. Thermoplastic moulding compositions prepared from an ABS polymer and 0.05 to 5 wt. % (relative to the ABS polymer) of a combination of zinc oxide and/or magnesium oxide and at least one compound containing epoxy groups.

2. Thermoplastic moulding compositions according to claim 1 prepared from

I. 100 parts by weight of an ABS polymer consisting of
  1.) 5 to 100 wt. % of at least one graft copolymer produced by graft polymerising
    1.1) 5 to 90 wt. % of a mixture of
      1.1.1) 5 to 50 wt. % of acrylonitrile, methacrylonitrile, maleic anhydride, N-substituted maleimide or mixtures thereof and
      1.1.2) 95 to 50 wt. % of styrene, α-methylstyrene, ring-substituted styrene, methyl methacrylate or mixtures thereof onto
    1.2) 95 to 10 wt. % of at least one rubber having a glass transition temperature $T_G$ of $\leq 10°$ C. and
  2.) 0 to 95 wt. % of at least one thermoplastic resin produced by polymerising
    2.1) 5 to 50 wt. % of acrylonitrile, methacrylonitrile, maleic anhydride, N-substituted maleimide or mixtures thereof and
    2.2) 95 to 50 wt. % of styrene, α-methylstyrene, ring-substituted styrene, methyl methacrylate or mixtures thereof and II. 0.05 to 5 parts by weight of a combination of zinc oxide and/or magnesium oxide and at least one compound containing epoxy groups.

3. Thermoplastic moulding compositions according to claim 1 containing a combination of zinc oxide and/or magnesium oxide and a liquid compound containing epoxy groups.

4. Thermoplastic moulding compositions according to claim 3 containing a combination of zinc oxide and a liquid compound containing epoxy groups having an epoxy oxygen content of 2 to 20 wt. %.

5. Process for the production of ABS moulding compositions according to claim 1, characterised in that 0.05 to 5 wt. % (relative to ABS polymer) of a combination of zinc oxide and/or magnesium oxide and at least one compound containing epoxy groups is added to an ABS polymer and mixed at a temperature of 100° C. to 300° C.

6. Process for the production of ABS moulding compositions according to claim 5, characterised in that a combination of zinc oxide and a liquid compound containing epoxy groups having an epoxy oxygen content of 2 to 20 wt. % is used.

7. Thermoplastic moulding compositions according to claim 1 wherein the at least one compound containing epoxy groups has an epoxy oxygen content of 2 to 20 wt. %.

8. Thermoplastic moulding compositions according to claim 7 wherein the epoxy oxygen content is 2.5 to 15 wt. %.

9. Thermoplastic moulding compositions according to claim 7 wherein the epoxy oxygen content is 3 to 10 wt. %.

10. Thermoplastic moulding compositions according to claim 1 having a weight ratio of zinc oxide and/or magnesium oxide to expoxy compound of 95:5 to 5:95.

11. Thermoplastic moulding compositions according to claim 10 wherein the weight ratio of zinc oxide and/or magnesium oxide to epoxy compound is 80:20 to 20:80.

12. Thermoplastic moulding compositions according to claim 10 wherein the weight ratio of zinc oxide and/or magnesium oxide to epoxy compound is 60:40 to 30:70.

13. Thermoplastic moulding compositions according to claim 1 wherein the combination of zinc oxide and/or magnesium oxide and at least one compound containing epoxy groups is 0.1 to 3 wt. % relative to the ABS polymer.

14. Thermoplastic moulding compositions according to claim 1 wherein the at least one compound containing epoxy groups is liquid.

15. Thermoplastic moulding compositions according to claim 14 wherein the liquid compound has a molecular weight below 2000.

16. Thermoplastic moulding compositions according to claim 14 wherein the liquid compound has a molecular weight below 1500.

17. Thermoplastic moulding compositions according to claim 1 wherein the at least one compound containing epoxy groups is an epoxidized oil.

18. Thermoplastic moulding compositions according to claim 1 wherein the at least one compound containing epoxy groups is alkyl epoxystearate.

* * * * *